March 3, 1970  H. WAGNER  3,498,153

STEERING GEAR WITH ROTARY BALL NUT

Filed Jan. 30, 1968

Inventor
Heinrich Wagner
by *Albert Zalkind*
Attorney

United States Patent Office 3,498,153
Patented Mar. 3, 1970

3,498,153
STEERING GEAR WITH ROTARY BALL NUT
Heinrich Wagner, Schwabisch Gmund, Germany, assignor to Zahnradfabrik Friedrichshafen Aktiengesellschaft, Friedrichshafen, Germany, a corporation of Germany
Filed Jan. 30, 1968, Ser. No. 701,646
Claims priority, application Germany, Feb. 10, 1967, Z 12,696
Int. Cl. B62d 1/20
U.S. Cl. 74—499    6 Claims

ABSTRACT OF THE DISCLOSURE

A steering gear worm mechanism of the ball nut type having a gear rack, one important feature being that the nut is slideably supported in its motion during heavy steering loads by a housing which encompasses the steering spindle worm. By providing a construction such that the spindle worm has bearing support at both ends, a smaller nut of fewer balls can be utilized.

The prior art has heretofore known rotary ball nuts in steering gear mechanisms wherein the nut is axially movable on the spindle worm and in which force transmitted between the nut gear rack and the steering gear segment on the steering stub shaft, which operates the steering linkage, must be absorbed by the spindle worm. This requires large dimensioning of the worm in order to guard against bending beyond a permissible limit. Further, in such constructions, in order to prevent a canting of the nut, the nut must be made fairly long and provided with a long ball track with many balls taking the stress between worm and nut.

Accordingly, prior art arrangements as described above, are necessarily fairly large as contrasted with the present invention which permits use of a smaller nut.

A further type of prior art construction utilizes a rotary ball nut wherein the re-circulation conduit is disposed in a recess of the nut, as in the present invention, but wherein there is only a single bearing for the spindle worm. Accordingly, the ball nut receives stress of all transverse forces acting on the spindle worm and as a result heavy frictional forces occur between the nut and the housing.

Briefly, the invention comprises a construction utilizing a housing wherein a ball nut is non-rotatably and reciprocally mounted on a steering spindle worm and has a sliding bearing support against the housing under heavy steering loads. The ball nut is shorter than the conventional ball nut and has slightly less than two ball loaded grooves. The steering spindle worm has ball bearing support in the housing on each end and the ball nut has an annular recess to accommodate a ball conduit.

A detailed description now follows in conjunction with the appended drawing, in which.

Figure 1:
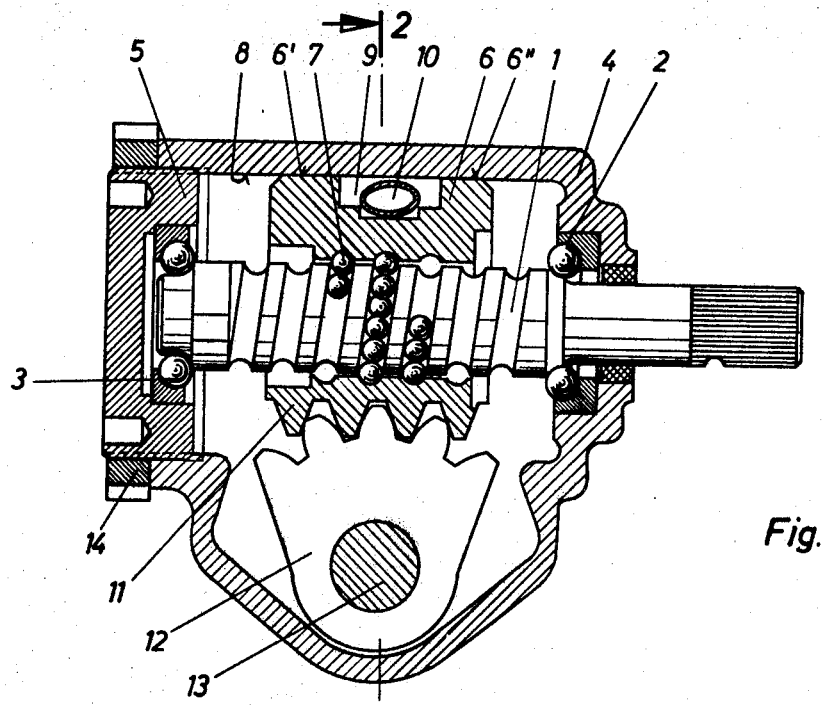
FIGURE 1 is a longitudinal cross-section of the invention.
Figure 2:
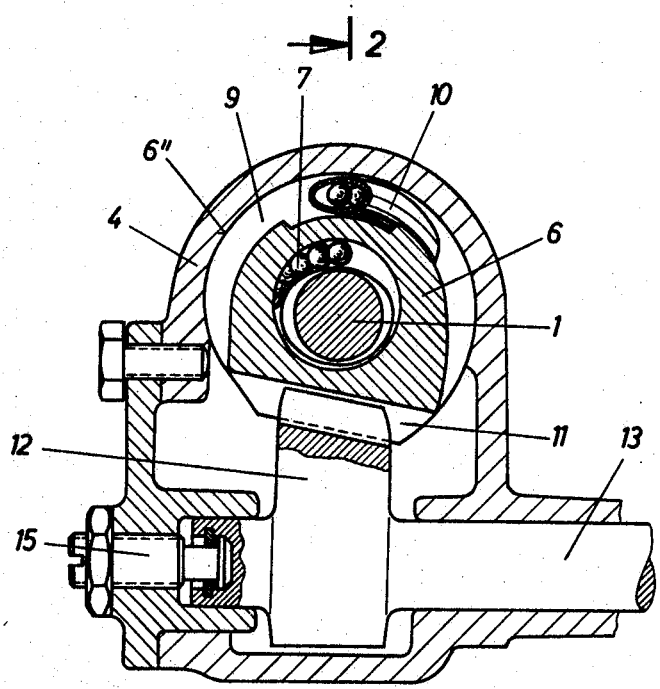
FIGURE 2 is a section through 2—2 of FIGURE 1.

Referring to the drawing, a housing 4 is shown having a threaded end closure 5 with a locking nut 14 wherein the housing accommodates a steering spindle worm 1, a ball nut 6, and a gear-toothed steering segment 12. The gear segment 12 is keyed to the usual stub shaft 13 having conventional bearing support in the housing and which actuated the steering mechanism (not shown) and will be understood to have a conventional axial adjusting device 15 (FIGURE 2) whereby it can be adjusted for tooth wear due to the force transmitting contact with the rack 11 of ball nut 6, the teeth of the segment being conventionally conical for that purpose.

It will be noted that the spindle worm 1 is supported at its ends by ball bearings 2 and 3 fixed, respectively, in the housing at the right-hand end and in the end cap 5 at the left-hand end.

From the above construction it will be apparent that there is no cantilever bending force on the spindle worm 1 because of the ball bearing supports provided. However, a slight amount of central bending is permitted under stress. Thus, when the spindle is not under stress, that is, is not performing a steering function, a slight amount of radial play is permitted the end flanges 6' and 6" of the ball nut 6 with respect to the internal surface 8 of the housing 4. These flanges are circular where congruous with a circular interior of the housing so that upon a slight predetermined bending stress of the worm the play between the flanges and the housing is eliminated and a large area of the ball nut is slideably supported by the housing which minimizes bending of the spindle and locking of the worm. A predetermined steering stress will result in the bending of the spindle worm in order to take up the play between the steering nut and the housing, and accordingly by permitting such play for ordinary light effort steering conditions the translation of the ball nut occurs very readily and the force required to be exerted at the steering wheel is very slight; in fact, fingertip control is realized.

Of course, when the spindle worm deflects under heavy load some play is caused between the rack 11 and the teeth of gear segment 12, but this play is immediately taken up upon reduction of the load on the worm and there is no reasonable possibility of locking of the mechanism.

A further advantage of the arrangement is the fact that considerable bending deflection can be permitted in the steering column (not shown) without affecting the operation of the mechanism just described.

It has been found that by virtue of the construction a shorter ball nut can be used with actually less than two grooves loaded with balls 7. In such instance, a single ball return conduit 10 can be utilized advantageously placed in an annular recess 9 formed in the ball nut surface. Further, the return conduit can be readily arranged centrally of the ball nut, or substantially centrally, without any particular attachment thereto.

From the foregoing description it will be apparent that an improved steering mechanism or steering drive connection between the steering column and the steering stub shaft has been provided, effecting a maximum of economy in view of the fact that a shorter ball nut can be used since the ball nut is not required to resist bending stresses in the steering worm. Accordingly, a lesser number of ball loaded grooves can be used than in conventional constructions, and the entire construction is more compact.

It is claimed:

1. In a device of the class described, a steering spindle worm and a ball nut thereon, a housing encompassing said ball nut wherein a predetermined degree of play between said ball nut and housing is provided when said spindle worm is subjected to less than a predetermined degree of bending stress, and wherein bending of said spindle worm due to said predetermined stress effects a slideable supporting engagement between said ball nut and said housing; including a ball bearing support at each end of said steering worm and carried by said housing.

2. A device as set forth in claim 1, said ball nut having a rack and a gear-toothed segment engaging said rack, wherein there is substantially no play between said rack and said gear-toothed segment up to the point where exertion of bending stress is effected on said spindle worm and wherein play occurs subsequent to predetermined deflection of said spindle worm when said ball nut engages said housing for sliding support.

3. A device as set forth in claim 1, said housing having a partially cylindrical configuration and said ball nut having a congruous partially cylindrical configuration for sliding support coaction with said housing.

4. A device as set forth in claim 3, said ball nut having end flanges effecting said partially cylindrical configuration and engageable with said housing, and an annular recess in said ball nut intermediate said flanges, and a return ball conduit in said recess.

5. A device as set forth in claim 4, said spindle worm having no more than two ball loaded grooves coacting with said ball nut.

6. A device as set forth in claim 4, said gear-toothed segment having a conical configuration of gear teeth whereby said segment may be axially shifted to effect adjustment.

References Cited

UNITED STATES PATENTS

| 1,967,482 | 7/1934 | Schmidt | 74—499 X |
| 3,121,345 | 2/1964 | Zeigler et al. | 74—499 X |
| 3,170,338 | 2/1965 | Ivanchich | 74—499 |

FOREIGN PATENTS

| 596,267 | 12/1947 | Great Britain. |

LEONARD H. GERIN, Primary Examiner

U.S. Cl. X.R.

74—459